(No Model.) 2 Sheets—Sheet 1.

A. DESGOFFE & O. AVEDYK.
APPARATUS FOR CONVERTING GRAIN INTO BAKERS' DOUGH.

No. 582,272. Patented May 11, 1897.

WITNESS:
Otto Munn
W. W. Hopping

Auguste Desgoffe
Octave Avedyk
INVENTORS

C. Richards
Att'ys

THE NORRIS PETERS CO., PHOTO-LITHO., WASHINGTON, D. C.

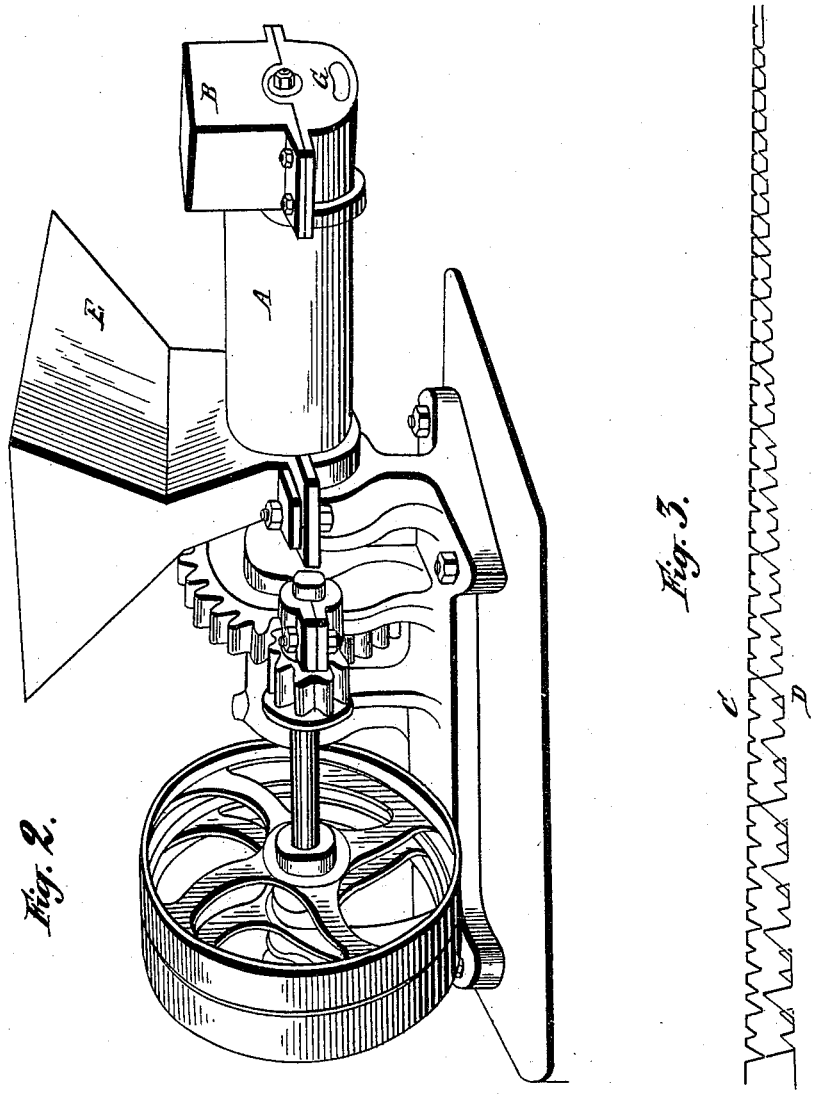

UNITED STATES PATENT OFFICE.

AUGUSTE DESGOFFE, OF PARIS, FRANCE, AND OCTAVE AVEDYK, OF BRUSSELS, BELGIUM.

APPARATUS FOR CONVERTING GRAIN INTO BAKERS' DOUGH.

SPECIFICATION forming part of Letters Patent No. 582,272, dated May 11, 1897.

Application filed November 13, 1896. Serial No. 611,978. (No model.) Patented in France December 31, 1892, No. 226,822; in Belgium July 2, 1896, No. 122,313, and in England July 4, 1896, No. 14,854.

*To all whom it may concern:*

Be it known that we, AUGUSTE DESGOFFE, a citizen of the Republic of France, residing at 13 Rue de Chabrol, Paris, France, and OCTAVE AVEDYK, a subject of the King of Belgium, residing at 12 Avenue Brugman, Brussels, Belgium, have invented certain new and useful Improvements in Apparatus for Converting Grain into Bakers' Dough by a Single Operation, (patented in Belgium July 2, 1896, No. 122,313; in France December 31, 1892, No. 226,822, and in Great Britain July 4, 1896, No. 14,854,) of which the following is a full, clear, and exact description.

This invention has for its object to obtain bakers' dough direct from whole grain in a single operation without previous milling. Among the numerous advantages of this arrangement mention may be made more particularly of the following: First, the suppression of the cumbersome mechanism and the costly manipulation at the mill; second, a raw material which may easily be preserved indefinitely in a wholesome condition, instead of flour, which very easily deteriorates; third and more particularly, the preservation in the bread of all the nutritive qualities of the wheat, comprising that of the bran, which by this improved apparatus is reduced into such impalpable fragments that it mixes in the dough under the same conditions as the other parts of the wheat in such a way that it is impossible to distinguish it, and thus imparts to the bread very superior nutritive qualities without interfering with its digestibility.

The operation, while being performed in a single apparatus, is composed, in fact, of two distinct phases—first, the absolute disintegration of the grain previously soaked, and, second, the kneading and the smooth working of the paste thus obtained. In order to be able to cope with these two manipulations, the apparatus is composed of two distinct parts which, while fixed on one and the same shaft and receiving consequently the same movement, operate on the same parts of the dough in succession, but without any interruption, so that the soaked grain enters at one end of the apparatus and dough perfectly kneaded emerges at the other end.

The apparatus is shown in the accompanying drawings, in which—

Figure 1:
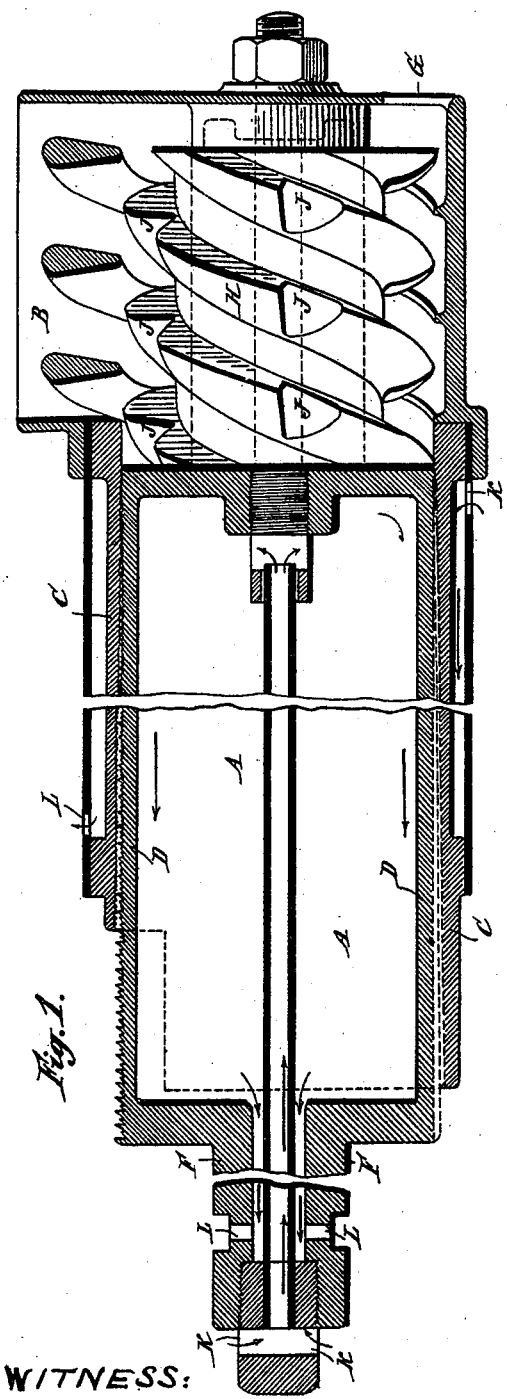
Figure 4:
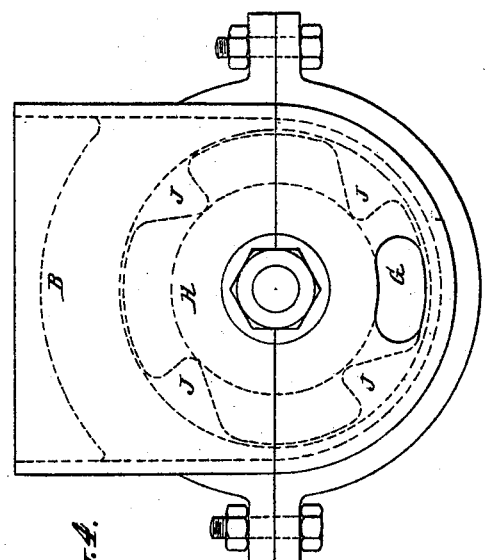

Figure 1 is a vertical section through the axis of the apparatus, with the male helix of the kneading and working device shown in side elevation. Fig. 2 is a view in perspective, on a reduced scale, of the whole apparatus. Fig. 3 is a detailed view, on an enlarged scale, of the male and female helices of the disintegrator; and Fig. 4 is an end view of the kneader or worker, with its helices indicated in dotted lines.

Apart from the driving mechanism of the machine, which may be easily understood by reference to Fig. 2, the apparatus is composed, essentially, of the disintegrator A and of a kneader B, which will each be separately described.

The disintegrator A is essentially composed of a casing C, (female part,) rigidly fixed on a frame, and of a long hollow mandrel D, (male part,) entering into the casing C. An opening is arranged in the upper rear part of the casing C to connect with the feed-hopper E, Fig. 2, by which opening the wheat enters directly from the hopper in order to pass from end to end between the male and female parts of the apparatus.

The casing C, which is perfectly cylindrical on the outside, is slightly tapered on the inside, and this conical or tapered surface is provided with a series of main female helices having parallel spirals and presenting the section of a slightly-truncated cone in such a way as to have two faces instead of a single one. Between two main consecutive helices are arranged throughout the casing the spirals of a secondary helix less elevated than those of the main helices, but also truncated. The heights of the two series of helices continue diminishing from the one end (feed) to the other end (discharge) and gradually become of equal height in such a way that at the discharge end there are no longer main and secondary helices, but a single series of helices the spirals of which continue diminishing regularly. An inspection of Fig. 3 will sufficiently explain this arrangement.

The mandrel D, which revolves with the shaft F of the apparatus, is provided with male helices the spirals of which are directed in a contrary direction to those of the female helices of the casing—that is to say, that if the female helices are pitched to the right the male helices are pitched to the left. The male helices also consist of a series of main helices the spirals of which are higher than those of the main helices of the female part, the pitch or distance apart of the spirals of the male part being proportional to the kind of grain on which it is desired to operate. For wheat a distance apart of the spirals of six millimeters has been found to work perfectly. Between the spirals of the main helices throughout the mandrel the spirals of two series of secondary helices are arranged when it is a question of treating wheat at about two millimeters apart. From the feed end the second helix is mounted on the slope of the spirals of the main helix, which follows it immediately and gradually separates therefrom as it approaches the discharge; and, the same as with the female part, the height of the spirals goes on diminishing from the feed to the discharge, so that at the discharge end there are no longer main and secondary helices, but a single arrangement of parallel helices which continue diminishing uniformly to the discharge. As the body of the mandrel remains cylindrical from one end to the other and the spirals of the helices diminish in height, it follows that their base diminishes in width and affords space for the spirals of the two series of secondary helices, one of which was at first mounted on the slope of the main helix. The points of the spirals are also truncated, as with the female helices, so that each presents two inclined faces. Fig. 3 shows this arrangement in a sufficiently clear manner.

Experience has shown that the best inclination to give to all the helices indiscriminately is preferably seventeen degrees forty minutes, calculated as starting from a perpendicular to the axis of the helices, an angle which corresponds to an equal pitch at the diameter. The profiles of the different helices will be similar triangles, the rear faces of the male spirals (feed end) forming an angle of forty-five degrees with the vertical and the front faces (discharge end) having a batter of one-tenth. These inclinations are reversed for female helices—that is to say, the front faces form an angle of forty-five degrees with the vertical, and the rear faces a batter of one-tenth. The triangles representing the longitudinal sections of the male helices and those representing the longitudinal sections of the female helices will have, therefore, their similar sides parallel. Experience has shown that these arrangements and profiles of the helices form intervals between the spirals, which become filled completely without vacancies or accumulations, and that the substance emerges therefrom in absolutely homogeneous and continuous bands or strips.

The kneading device B: This part of the apparatus is formed of a box having a semi-cylindrical bottom and composed of two parts bolted together. The lower half is of semi-circular section and on its front face is provided with an opening G for discharging the dough. The other half has the form of a rectangular box open at the top in order to allow free access of air to the interior of the box. The shaft bearing the mandrel of the disintegrator is prolonged into the interior of the kneading-box thus formed and carries a helix H, the body of the box being provided with a counter-helix. The spirals of the helix H, which are also preferably pitched to seventeen degrees forty minutes, like those of the helices of their disintegrator, are much higher and farther apart than these latter. This is of course necessary, seeing that they serve for kneading and working the dough, while the former served for crushing the grain.

It follows that the kneader can hold much more dough than the crusher can furnish in one revolution. The dough remains, therefore, for some time in the kneading-machine in order to be there worked for a considerable space of time. In order to render this kneading more energetic, the spirals of the helix of the kneader are provided with a series of notches J, thus forming beaters on the helix which beat the dough during its movement. The spirals of the counter-helix have only little depth at the part lying in the lower cylindrical part of the box, while in the upper part they have more depth and project much more, in order that they may never become stopped by the dough, and they thus constantly allow air to enter by the upper orifice of the box.

Although the aeration of the dough during the kneading or working is eminently useful, it is not absolutely indispensable, and its suppression, when it is deemed possible to dispense with it, allows of the kneading and working machine being made less bulky and the helix and counter-helix being replaced by a more simple apparatus, such as, for instance, a kind of flat rasp terminating the mandrel D and working in conjunction with a fixed surface provided with planes inclined in an opposite direction to those of the rasp, an opening in the center of the fixed surface allowing the dough to escape.

In order to prevent any heating of the various parts of the apparatus, both the hollow mandrel D and also the casing C are constantly traversed by streams of water, which flow through pipes and openings arranged in the shaft F and in the casing C. The direction of these jets of water is sufficiently indicated in the drawings by arrows, their entrance being shown at K and their discharge at L.

The apparatus works in the following manner: A sufficient quantity of soaked grain is poured into the hopper E, and engages immediately between the spirals of the main helices, which serve to cause the grain to advance toward the interior of the apparatus. During this advancement the grains are crushed partly by their friction one with another and partly by their contact with the sharp slopes of the secondary helices. In proportion to the advancement the number of slopes increases, seeing that the main and auxiliary helices separate, and the grain thus triturated and crushed arrives at the end of the grinding apparatus in a state of paste the molecules of which are impalpable and in which the bran is no longer recognizable. This paste is then received by the kneading and working device, in which it is kneaded for a considerable time between the helix and the counter-helix, beaten by the wings formed by the recesses J, and aerated during all this time of kneading in such a way that on its discharge from the apparatus it is ready to receive the yeast.

What we claim is—

1. An apparatus for transforming whole grain into bakers' dough, comprising a series of spiral male and female helices with a space between for the passage of the grain and a kneading device receiving the crushed grain and kneading the same into dough, substantially as described.

2. In combination, a series of male and female helices forming a spiral passage between, each helix having its spirals arranged in an opposite direction one to the other, a kneading-helix receiving the crushed grain and mixing it into dough, and a single shaft for operating the crushing and kneading devices, substantially as described.

3. In combination, a hopper to receive the grain, a crushing device consisting of male and female helices with a passage between, a box open to the air, a kneading device therein adapted to receive the crushed grain, the helices of the kneading device being recessed or notched, substantially as described.

In witness whereof we have hereunto set our hands in presence of two witnesses.

AUGUSTE DESGOFFE.
OCTAVE AVEDYK.

Witnesses:
AUGUSTE DE CEUSTERN,
GREGORY PHELAN.